United States Patent Office.

JAMES QUINN, JR., OF GRAND RAPIDS, MICHIGAN.

MANUFACTURE OF WHITING.

SPECIFICATION forming part of Letters Patent No. 346,768, dated August 3, 1886.

Application filed August 17, 1885. Serial No. 174,615. (Specimens.)

*To all whom it may concern:*

Be it known that I, JAMES QUINN, Jr., a citizen of the United States, residing at Grand Rapids, in the county of Kent and State of Michigan, have invented certain new and useful Improvements in the Manufacture of Whiting; and I do hereby declare the following to be a full, clear, and exact description of the invention, such as will enable others skilled in the art to which it appertains to make and use the same.

My invention relates to a new article of whiting produced from calcined gypsum, and can be used for all purposes for which whitings made from English chalks and like substances are now used.

What is commonly known as "whiting" is produced by finely pulverizing imported chalks, then cleansing the same of impurities by floating in water, then drying.

My invention consists in producing a whiting from calcined gypsum, commonly known as "plaster," in the following manner: I take ordinary ground gypsum that has been calcined, mix with sufficient quantity of water to set the same into a solid mass, which I then place in a strong heat and produce a hard chalk. I then grind this chalk very fine in the ordinary manner, and produce a pure article of whiting.

The method of manufacturing plaster is well known, and I do not claim any improvement in the manufacture of the same; but what I do claim is a method of producing a chalk from plaster, from which a pure whiting can be made, substantially as described.

The article which I produce differs from plaster-of-paris in this respect: that it does not solidify when mixed with water, even after the expiration of a long time, and when the water has at last evaporated it can be easily reduced to its pulverulent condition, whereas plaster-of-paris very quickly after being mixed with water hardens into a solid, stone-like mass. It differs from whiting in the mode and cost of production and in the quality for the purposes to which it is applied, as elsewhere set forth.

I am also well aware that there are several kinds of whiting now in use, and I do not claim to have invented a whiting for any new purpose; but a whiting produced by my method has been found superior to whitings now known for the same purposes—viz., fresco, scenic, and all distemper painting. It is also whiter and can be produced at a less cost.

Having thus described my invention, what I claim is—

1. A method of producing a whiting from chalk made from calcined gypsum, which consists, first, in mixing ground calcined gypsum with a sufficient quantity of water to set the same into a solid mass; secondly, placing the same in a strong heat, to produce a hard chalk, and, thirdly, grinding this chalk very fine, whereby a pure superior article of whiting is produced, substantially as described.

2. A pure whiting consisting of finely-pulverized chalk produced from calcined ground gypsum which has been previously set and hardened, substantially as described.

In testimony whereof I affix my signature in presence of two witnesses.

JAMES QUINN, JR.

Witnesses:
JAMES R. SHELLY,
S. N. BROSNAN.